(12) United States Patent
Petit et al.

(10) Patent No.: US 7,322,298 B2
(45) Date of Patent: Jan. 29, 2008

(54) FLEXIBLE FLOOR AND A CORRIDOR CONNECTION INCLUDING THE FLOOR

(75) Inventors: Jean-Claude Petit, Mouvaux (FR); Richard De Antonio, Sainte Genevieve des Bois (FR)

(73) Assignee: Hutchinson (FR)

( * ) Notice: Subject to any disclaimer, the term of this patent is extended or adjusted under 35 U.S.C. 154(b) by 151 days.

(21) Appl. No.: 11/063,899

(22) Filed: Feb. 23, 2005

(65) Prior Publication Data

US 2005/0183622 A1 Aug. 25, 2005

(30) Foreign Application Priority Data

Feb. 25, 2004 (FR) ................................. 04 01885

(51) Int. Cl.
*B60D 5/00* (2006.01)
(52) U.S. Cl. ...................................................... 105/8.1
(58) Field of Classification Search ................ 105/8.1, 105/15, 18, 19, 20
See application file for complete search history.

(56) References Cited

U.S. PATENT DOCUMENTS 4,905,607 A * 3/1990 Wanneroy ................... 105/8.1
6,009,813 A * 1/2000 Britzke ........................ 105/8.1
6,401,626 B1 * 6/2002 Goebels et al. ............... 105/18

FOREIGN PATENT DOCUMENTS

EP 0 860 305 A 8/1998
FR 2 573 714 A 5/1986

* cited by examiner

Primary Examiner—S. Joseph Morano
Assistant Examiner—Robert J. McCarry, Jr.
(74) Attorney, Agent, or Firm—Alston & Bird LLP

(57) ABSTRACT

The invention relates to a flexible floor designed to be suspended from an undulating flexible bellows in order to form a corridor connection module, said floor presenting undulating raised edges at its transverse ends, and, on its bottom face, transverse ribs in which metal reinforcements are embedded. According to the invention, at least some of the metal reinforcements have ends that project beyond the transverse ribs, each of which projecting ends is coupled to a fastening device for fastening the floor to the bellows, which fastening device extends alongside the outside of the corresponding undulating raised edge and presents a fastening end for fastening to the bellows that is situated above the corresponding raised edge.

11 Claims, 3 Drawing Sheets

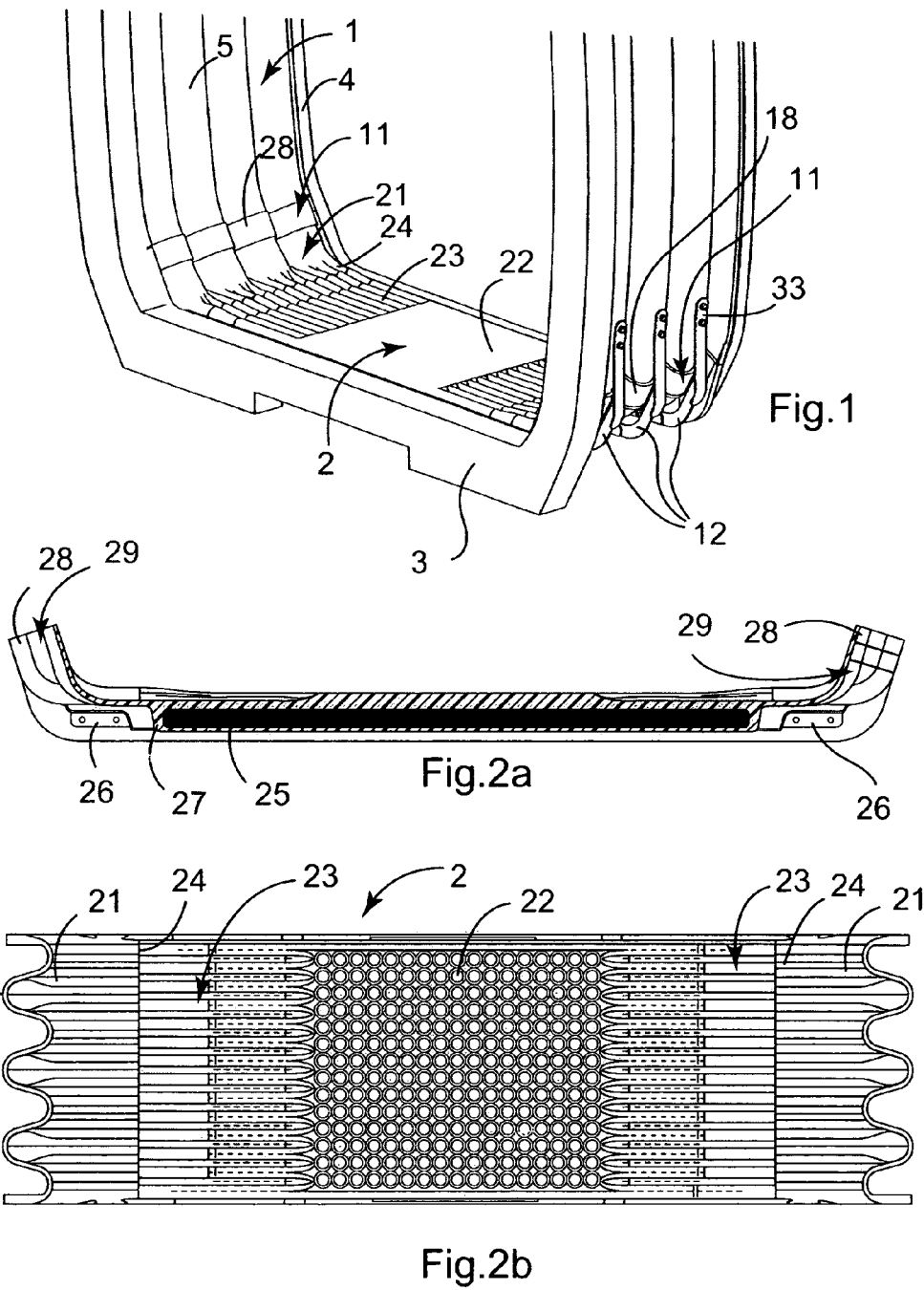

FLEXIBLE FLOOR AND A CORRIDOR CONNECTION INCLUDING THE FLOOR

The present invention relates to a flexible floor designed for a gangway corridor connection for intercommunication between two cars, and more particularly designed for rail vehicles such as trains, subway trains, trams, etc., or more generally for any rail or non-rail moving assembly. The present invention also relates to a corridor connection including such a flexible floor.

BACKGROUND OF THE INVENTION

Certain known devices require doors and do not provide any protection from cold and noise, while others use a system made up of a protective bellows and of a metal floor, with all the ensuing problems of metal slides and hinges in the floor.

Other devices require space to be dedicated to them in the ends of the bodies for the purpose of receiving the floor systems.

Most devices require mechanical load take-up or load bearing systems, e.g. bearing on the coupling bar. Using such known devices is not without problems relating to maintenance, to wear, to noise, to lack of compactness, to cleaning, e.g. for draining cleaning water, or to cavities in which various objects can build up.

Flexible floors also exist that are connected to a bellows, the flexible floor and the bellows forming a corridor connection module that is self-supporting. Such a flexible floor is known, for example, from European Patent EP 860 305.

In the current state of the art, implementing such a floor whose weight is supported by the bellows requires mechanical couplings between the bellows and the raised edges of the floor. In addition to being visible, such a coupling suffers from the drawback of providing no sealing, and therefore of offering only a very small amount of noise attenuation at the coupling between the floor and the bellows.

OBJECTS AND SUMMARY OF THE INVENTION

An object of the present invention is to provide a flexible floor for a corridor connection which, while maintaining its properties as regards requirements due to displacements between the bodies of the cars, offers better noise attenuation and improved appearance.

In the Application below and by definition, the horizontal direction of movement in a straight line of the moving assembly is considered to be longitudinal, and the horizontal direction perpendicular to the longitudinal direction is considered to be transverse.

The invention thus provides a flexible floor designed to be suspended from an undulating flexible bellows in order to form a corridor connection module, said floor presenting undulating raised edges at its transverse ends, and, on its bottom face, transverse ribs in which metal reinforcements are embedded, wherein at least some of the metal reinforcements have ends that project beyond the transverse ribs, each of which projecting ends is coupled to a fastening device for fastening the floor to the bellows, which fastening device extends alongside the outside of the corresponding undulating raised edge and presents a fastening end for fastening to the bellows that is situated above the corresponding raised edge.

This structure thus makes it possible for the floor to be coupled mechanically to the bellows via the outside, independently of the coupling between the raised edges and the bellows, which coupling can be achieved easily in sealed manner and thus under good noise conditions since the mechanical function of supporting the floor no longer needs to be provided there at.

In addition, the mechanical coupling to the bellows, implemented on the outside, and separately from the coupling between the raised edges of the floor and the bellows, also makes it possible, e.g. by means of fastening using bolts, to maintain good soundproofing qualities.

The raised edges are advantageously disposed in a bend region of the floor.

In another advantageous embodiment, at least one fastening device is a load take-up bar having a first end provided with a fastening element for fastening to a respective one of said projecting ends, and a second end provided with a fastening element for fastening to an undulation of the bellows. For example, the load take-up bar presents a rounded first region carrying, at said first end, a fastening element for fastening to a respective one of said projecting ends, and a second region extending upwards and terminated at said second end by a fastening element for fastening to an undulation of the bellows.

At least one fastening element may be designed to be fastened by bolts.

The invention also relates to a corridor connection comprising at least one corridor connection module including a flexible floor according to any preceding claim, and an undulating flexible bellows, wherein the fastening ends of the fastening devices are secured to the bellows, and wherein the undulating raised edges of the floor are secured in sealed manner to the undulations of the undulating flexible bellows in respective regions of complementary geometrical shape that are mutually overlapping.

Preferably, the overlap between said regions of complementary geometrical shape is situated in a bottom bend region of the corridor connection module.

The securing between the undulating raised edges and the undulating flexible bellows is advantageously performed by heat-sealing.

Said fastening devices are advantageously secured to the bellows by bolts.

The corridor connection may comprise two said corridor connection modules assembled together longitudinally via a coupling ring.

In known manner, the ends of a longitudinal module may be equipped with metal and/or composite parts making it possible to fasten said module to the body and/or to the coupling ring.

BRIEF DESCRIPTION OF THE DRAWINGS

Other characteristics and advantages of the invention appear more clearly on reading the following description with reference to the accompanying drawings, in which:

FIG. 1 is a perspective view of a first embodiment of a corridor connection module of the invention;

MORE DETAILED DESCRIPTION

Figure 4A:
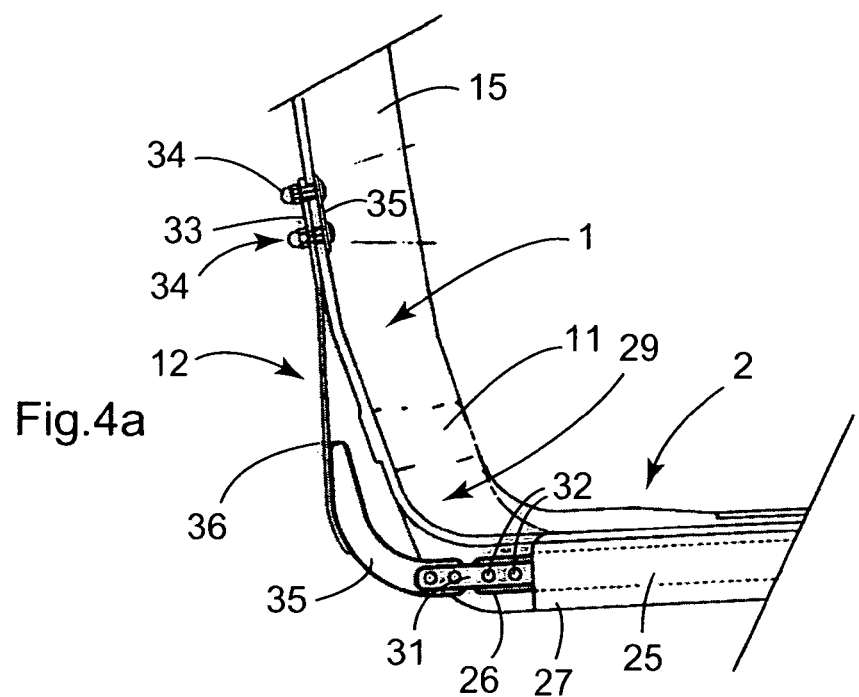
FIGS. 4a to 4c are section views showing the couplings, between the floor and the bellows, FIG. 4a being a detail of FIG. 3a, FIG. 4b showing a detail of the heat-sealed junction, and FIG. 4c showing the weatherstrip seals 37 between the bellows and the car.
Figure 4B:
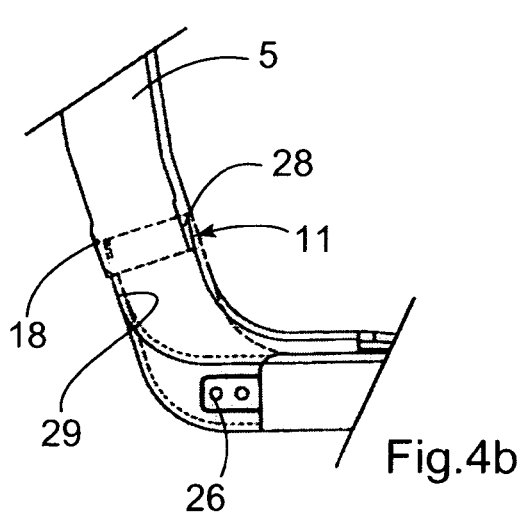

In known manner, a corridor connection bellows equipped with a flexible floor is made up of at least one corridor connection module, each such module having a top portion or deformable bellows 1 having undulating regions, and a bottom portion or floor 2. The bellows 1 and the floor are made from an elastomer mixture in which textile reinforcement elements can be embedded (for the bellows) and metal can be embedded that is caused to adhere to the mixture (for the floor).

The bellows 1 and the floor 2 are different pieces which are assembled together to form a corridor connection module which constitutes a structure having a closed perimeter and that is preferably self-supporting.

In corridor connections currently in existence (in particular on the METEOR Line in Paris), mechanical assembly is performed at the raised edges, which gives rise to constraints and to drawbacks:

since the floor is supported by the bellows, the mechanical coupling can be provided only in vertical or substantially vertical regions of the side edges of the bellows, which requires the raised edges of the floor to extend to a region of the bellows that is substantially vertical; this complicates manufacturing of the floor, due to the technical constraints involved in molding raised edges that, at their ends, extend substantially vertically; and since the mechanical coupling is provided at the overlap between the raised edges and the bellows, the coupling is not sealed, and therefore the external noise is not damped, hence the level of soundproofing is low.

In conventional manner, a corridor connection of the invention (FIG. 1) comprises an undulating bellows 1 presenting long undulations 5, and a flexible floor 2. It is distinguished by the fact that the flexible floor 2 is suspended from the bellows 1 by load take-up bars 12 which provide suspender couplings via the outside, above the overlapping zones 11 between the top ends 28 of the raised edges 21 of the floor and the bottom ends 18 of the bellows 1.

In this way, the suspension and sealing functions are dissociated, and the mechanical coupling elements are not very visible from the inside of the corridor connection.

Figure 2C:
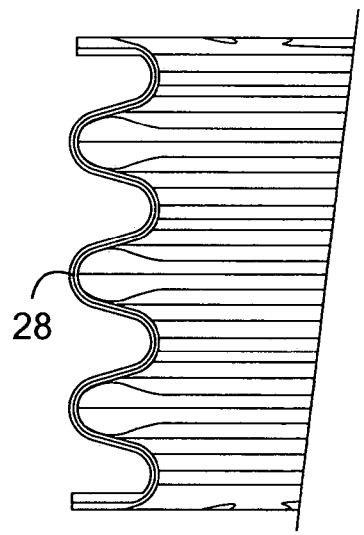
FIGS. 2a and 2b are respectively a cross-section view and a plan view of an embodiment of a floor of the invention, FIG. 2c being an enlargement of a detail of FIG. 2b, showing the floor from its top portion where it is heat-sealed to the bellows.
Figure 4C:
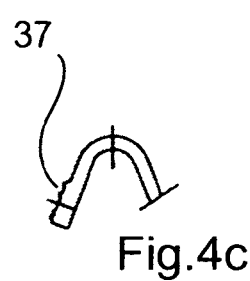

In known manner, the floor 2 can have a treaded central region 22 enabling passengers to pass through, and, on either side of said region 22, an undulating zone made up of short undulations 23 which terminate at their ends 24 by long undulations that form the raised edges 21 (FIGS. 1 and 2b) and that, at least at their ends 28 situated in the overlapping regions 11, have a geometrical shape that is complementary to the geometrical shape of the undulations 5 at the corresponding bottom ends 18 of the bellows 1 so as to form sealed couplings, e.g. by heat-sealing. In each region 11, reference 18 designates the overlapping end of the bellows, and reference 28 designates the overlapping end of the floor.

The corridor connection module shown in FIG. 1 is fixed to the body 3 at one of its longitudinal ends, and, at its other longitudinal end, to a ring 4 for coupling it to another corridor connection module, the two modules as assembled together constituting the corridor connection.

Figure 3A:
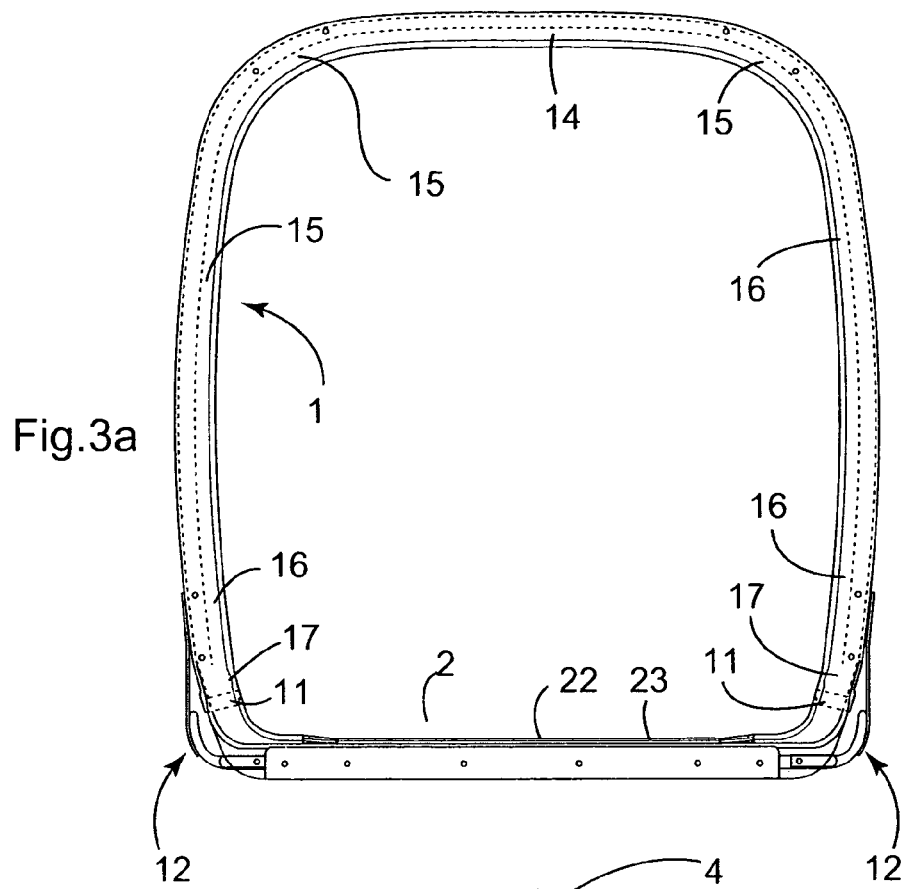
FIGS. 3a and 3b are respectively a cross-section view and a side view of an embodiment of a corridor connection bellows associating two corridor connection modules.

As shown in FIG. 3a, the corridor connection presents a closed periphery constituted by a top face 14 that is plane or slightly concave (as seen from the inside), by two top bends 15, by two vertical side faces 16 that are plane or slightly concave, and by two bottom bends 17 for coupling to the floor 2 which presents a load-bearing face 22, 23.

As also shown in FIG. 3a, the sealing coupling between the floor 2 and the bellows 1 is situated in the region of the bottom bend 17, which makes it possible to limit the extent to which the raised edges 21 rise. It can also be seen that, because of the fact that the sealing coupling is formed in this region of each bend 17, the end 25 of the corresponding raised edge 21 is situated in a bend region 29 and presents a direction that slopes relative to the vertical unlike in the prior art, in which, in order to provide the mechanical function of suspending the floor 2, the raised edges must extend to a vertical side edge so that their ends extend substantially vertically.

As a result, with the invention, a considerable advantage is procured for the molding of the floor, since, during such molding, the ends of the raised edges are lower, and they do not extend vertically.

FIG. 3a also shows that the mechanical couplings whereby the floor 2 is suspended by the bellows 1 are formed in the side faces 16 that are substantially vertical (ignoring the curvature of the faces 16), above the regions 11 of overlap between the ends 18 and 28 of the bellows 1 and of the floor 2.

This separation in space between said couplings makes it possible to provide a sealed coupling, e.g. by heat-sealing, between the bellows 1 and the floor 2 at the overlap coupling 11, hence the attenuation of external noise is improved. Such heat-sealing can be performed subsequently in a mold.

Figure 3B:
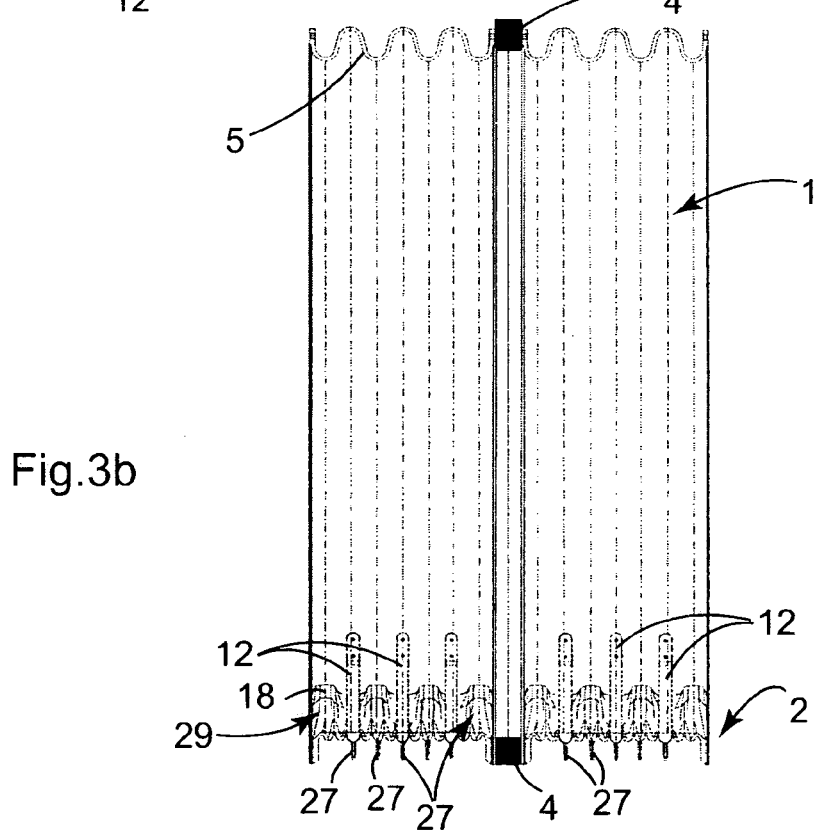

The mechanical couplings for suspending the floor 2 are explained below with reference to FIGS. 3b and 4a.

In known manner, in its bottom portion, the floor 2 presents transverse ribs 27 in which metal reinforcements 25 are embedded. In the invention, at least some of said metal reinforcements 25 also serve as supporting arms, and, at their ends, present projecting regions 26 making it possible to receive the load take-up bars 12. As shown in the example of FIG. 3b, one in every two metal reinforcements 25 also serves as a supporting arm.

Each load take-up bar 12 is fastened at one end 31 to a projecting region 26, e.g. by bolts 32, and at its other end 33 to the bellows 1. The fastening to the bellows 1 can be achieved by bolts 34. Said fastening takes place preferably at the troughs of the undulations of the bellows 2 as seen from the inside, i.e. at the crests of the undulations as seen from the outside.

For example, each load take-up bar 12 presents a first bend region 35 and a coupling tab 36 extending substantially vertically. As shown in FIG. 4a, the mechanical fastening thus achieved via the outside substantially does not project beyond the outside periphery of the corridor connection.

The mechanical fastening to the bellows makes it possible for good fluid-tightness and soundproofing to be achieved because said fastening is provided outside the overlap region 11.

The bolts 34 pass through openings provided in the bellows 2 and the fastening implements a backing plate 35 that stiffens the resulting assembly and contributes to improving the fluid-tightness and the soundproofing.

Another advantage is that the floor is removable, it being possible for the heat-sealed coupling between the floor 2 and the bellows 1 to be unsealed after the bolted mechanical coupling has been released.

What is claimed is:

1. A flexible floor designed to be suspended from an undulating flexible bellows in order to form a corridor connection module, said floor comprising an undulating zone made up of undulations which terminate at their transverse ends to form undulating raised edges, a bottom portion including transverse ribs in which metal reinforcements are embedded, wherein at least some of the metal reinforcements have ends that project beyond the transverse ribs, and a fastening device coupled to each of said projecting ends for fastening the floor to the bellows, said fastening device extending alongside the outside of the corresponding undulating raised edge and comprising a load take-up bar that presents a first end provided with a fastening element for fastening to a respective one of said projecting ends and a second end opposite from the first end and that is provided with a fastening element for fastening to an undulation of the bellows that is situated above the corresponding raised edge.

2. A floor according to claim 1, wherein the raised edges are disposed in a bend region of the floor.

3. A floor according to claim 1, wherein the load take-up bar presents a rounded first region which includes the first end, and a second region extending upwards and terminated by said second end.

4. A floor according to claim 1, wherein said fastening device is designed to be fastened by bolts.

5. A floor according to claim 1, the floor being made of elastomer.

6. A corridor connection comprising at least one corridor connection module including an undulating flexible bellows having undulations, and a flexible floor according to claim 1 connected to said bellows, wherein the fastening ends of the fastening devices are secured to the bellows, and wherein the undulating raised edges of the floor are secured in a sealed manner to the undulations of the undulating flexible bellows in respective regions of complementary geometrical shape that are mutually overlapping.

7. A corridor connection according to claim 6, wherein the sealed securing between the undulating raised edges and the undulations of the undulating flexible bellows is performed by heat-sealing.

8. A corridor connection according to claim 6, wherein said fastening devices are secured to the bellows by bolts.

9. A corridor connection according to claim 6, wherein the overlap between said regions of complementary geometrical shape is situated in a bottom bend region of the corridor connection module.

10. A corridor connection according to claim 6, comprising two said corridor connection modules assembled together longitudinally via a coupling ring.

11. A corridor connection comprising at least one corridor connection module having a closed perimeter including a top face and two vertical side faces, each of said side faces comprising an undulating flexible bellows having undulations, and a flexible floor suspended from said bellows, said floor comprising a treaded central region, an undulating zone on either side of said central region made up of undulations which terminate at their transverse ends to form undulating raised edges, and a bottom portion including transverse ribs in which metal reinforcements are embedded, wherein at least some of the metal reinforcements have ends that project beyond the transverse ribs, and a fastening device coupled to each of said projecting ends for fastening the floor to the bellows, said fastening device extending alongside the outside of the corresponding undulating raised edge and presenting a fastening end that is situated above the corresponding raised edge, wherein the fastening ends of the fastening devices are secured to the bellows, and wherein the undulating raised edges of the floor are secured in a sealed manner to the undulations of the undulating flexible bellows in respective regions of complementary geometrical shape that are mutually overlapping.

* * * * *